No. 756,365. PATENTED APR. 5, 1904.
R. J. HOFFMAN.
GAS METER.
APPLICATION FILED JULY 17, 1903.
NO MODEL.

Attest:
O. Middleton
Edward Sarton

Inventor:
Ross J. Hoffman
by Ellis Spear Company
Att'ys.

No. 756,365. Patented April 5, 1904.

UNITED STATES PATENT OFFICE.

ROSS J. HOFFMAN, OF BRADFORD, PENNSYLVANIA.

GAS-METER.

SPECIFICATION forming part of Letters Patent No. 756,365, dated April 5, 1904.

Application filed July 17, 1903. Serial No. 165,998. (No model.)

*To all whom it may concern:*

Be it known that I, ROSS J. HOFFMAN, a citizen of the United States, residing at Bradford, Pennsylvania, have invented certain new and useful Improvements in Gas-Meters, of which the following is a specification.

My invention is an improvement in meters for measuring and computing the quantity of gas used; and it relates particularly to means for compensating for variations in pressure of the gas or fluid, so that the accuracy of the computations or readings will not be affected by the said variations in pressure.

In gas-meters heretofore used it has been necessary in order to rectify the readings due to variations in pressure to make certain computations from the indicating-card, and it is the purpose of my invention to avoid the necessity of making these correcting computations when taking the readings from the indicator, and I do this by making the apparatus itself compensate for the additions in pressure.

It will be understood that my invention does not consist in any particular form of meter mechanism in itself, but is applicable to meters of various descriptions having different forms of operating mechanism.

The invention consists in the features and combination of parts hereinafter described, and pointed out in the claims.

Figure 1:
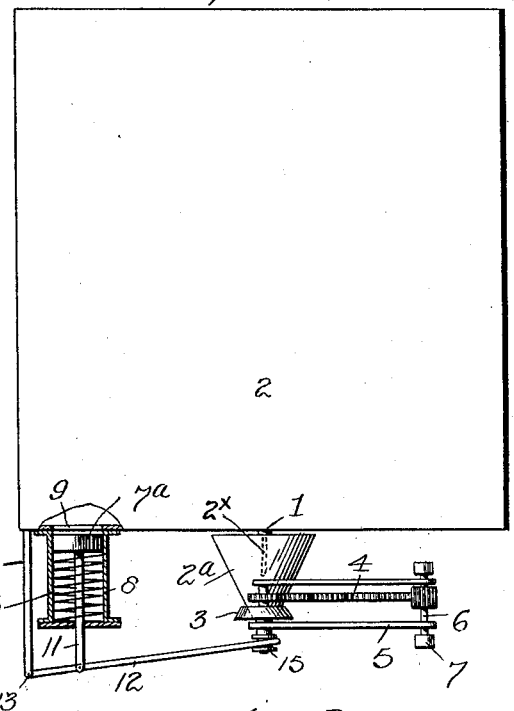
Figure 2:
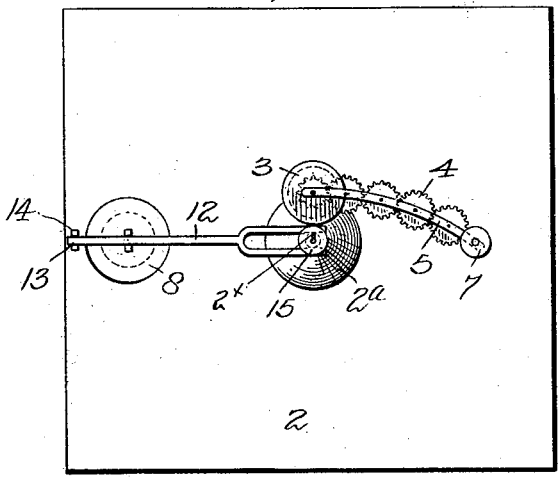

In the accompanying drawings, Figure 1 is a plan view of my invention applied to a meter-casing of any known description, and Fig. 2 is a front view of Fig. 1.

In the drawings, 1 indicates the spindle of the meter extending from a casing 2, which contains a meter mechanism of any well-known construction. The spindle 1 ordinarily connects directly with the indicating or computing mechanism, and it is turned by the flow of gas acting on the mechanism within the casing 2. In order to compensate for variations in pressure of the gas flowing through the meter and operating the spindle 1, I provide a cone $2^a$ on the spindle 1, having its apex directed outwardly, and resting on this cone is a wheel 3, which is driven by the rotary movement of the said cone and in turn imparts movement to a train of gearing 4, leading to the indicating means. This train of gearing is supported in a frame 5, pivoted at 6 axially of the wheel 7, which forms a part of the transmitting-train, so that the transmitting train of gears, together with the wheel 3, are free to rise and fall in relation to the axis of the spindle 1 without interference with the transmitting action, the said rising-and-falling movement being due to the shifting of the cone out and in along the spindle 1 to compensate for variations in pressure within the meter, as will be described hereinafter. I prefer to mount the cone on a sleeve by a keyway $2^x$, the said sleeve being attached to the spindle 1. The cone is moved longitudinally of the spindle to bring different parts of its surface to rotate the wheel 3 at different speeds by means of a piston $7^a$, arranged within a cylinder 8, attached to the casing on the meter, the said cylinder communicating freely with the interior of the casing through a port 9 and having therein a spring 10, acting on the piston in opposition to the pressure within the meter. The said piston has its rod 11 pivotally connected with a lever 12, which in turn is pivoted at 13 to a post 14, extending from the meter-casing. The end of the lever 12 is forked and engages a grooved collar 15, connected with the cone, so that as the lever 12 moves about its pivot under the action of the pressure within the meter or of the spring 10 when the said pressure is reduced the cone will be shifted along its shaft and will drive the wheel 3 and connecting-train faster or slower, according as the pressure is great or small. For instance, if the pressure is greater than that for which the parts are set the piston $7^a$ will be moved outwardly against the pressure of the spring 10, thus bringing the part of the cone of larger diameter into contact with the wheel 3, so as to drive the indicating-train at an increased speed, and when the pressure falls within the meter the spring 10 will move the piston $7^a$ inwardly, thus shifting the cone inwardly along its spindle and bringing its portions of smaller diameter to act against the wheel 3 and drive the indicating mechanism at a less rate of speed than that before mentioned. It will thus be seen that the indication or registering mechanism is controlled directly in the rapidity of its movement by the pressure of the gas within the meter, and it is not necessary to make any independent correcting computations, as the mechanism itself compensates for variations in pressure.

It will be understood that where I use the term "piston" herein the said term is meant to include any equivalent of such a device broadly, such as a diaphragm.

I claim as my invention—

1. In combination in a meter-registering mechanism, a shifting cone for driving the said registering mechanism and means for shifting the said cone by variations of pressure within the meter, substantially as described.

2. In combination with a meter, a cone for transmitting motion therefrom to the registering mechanism, a piston acted on by pressure within the meter and a connection between the said piston and the cone for shifting the same, substantially as described.

3. In combination with a meter having a rotary spindle, registering mechanism, a shifting cone on the spindle for transmitting motion to the registering mechanism, a piston connected with the said cone moved in one direction by the pressure within the meter and in the opposite direction by a spring, substantially as described.

In testimony whereof I affix my signature in presence of two witnesses.

ROSS J. HOFFMAN.

Witnesses:
NEWTON B. PARKER,
EDWIN E. TAIT.